(12) United States Patent
Urabe et al.

(10) Patent No.: US 11,995,586 B2
(45) Date of Patent: May 28, 2024

(54) PRODUCTION PLANNING SYSTEM AND PRODUCTION PLANNING METHOD

(71) Applicant: HITACHI, LTD., Tokyo (JP)

(72) Inventors: Shintaro Urabe, Tokyo (JP); Yuuichi Suginishi, Tokyo (JP); Akira Tada, Tokyo (JP); Satoshi Fukuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 841 days.

(21) Appl. No.: 17/091,026

(22) Filed: Nov. 6, 2020

(65) Prior Publication Data

US 2021/0216931 A1  Jul. 15, 2021

(30) Foreign Application Priority Data

Jan. 14, 2020  (JP) ................................. 2020-003575

(51) Int. Cl.
*G06Q 10/0631* (2023.01)
(52) U.S. Cl.
CPC ................. *G06Q 10/06313* (2013.01); *G05B 2219/32361* (2013.01)
(58) Field of Classification Search
None
See application file for complete search history.

(56) References Cited

U.S. PATENT DOCUMENTS

2013/0166055 A1\* 6/2013 Ishibashi ................ G06Q 10/08
700/100

FOREIGN PATENT DOCUMENTS

JP 2015-191418 A 11/2015

\* cited by examiner

*Primary Examiner* — Sean Shechtman
(74) *Attorney, Agent, or Firm* — MATTINGLY & MALUR, PC

(57) ABSTRACT

The time required to modify order allocation rules is shortened in a production planning system. A performance rule is generated, in which a manufacturing condition is set as the input and a manufacturing facility is set as the output, based on allocation performance data representing a performance of allocating the manufacturing facility for the manufacturing condition. A comparison table is generated representing a difference between the performance rule and an existing rule in which the manufacturing condition is set as the input and the manufacturing facility is set as the output. A modification rule is generated in which the existing rule is modified according to a user operation on the comparison table; and an evaluation index is calculated for production plan data corresponding to each of the existing rule and the modification rule. The rule modification unit generates the comparison table including a modification plan for the existing rule.

7 Claims, 13 Drawing Sheets

[FIG. 1]
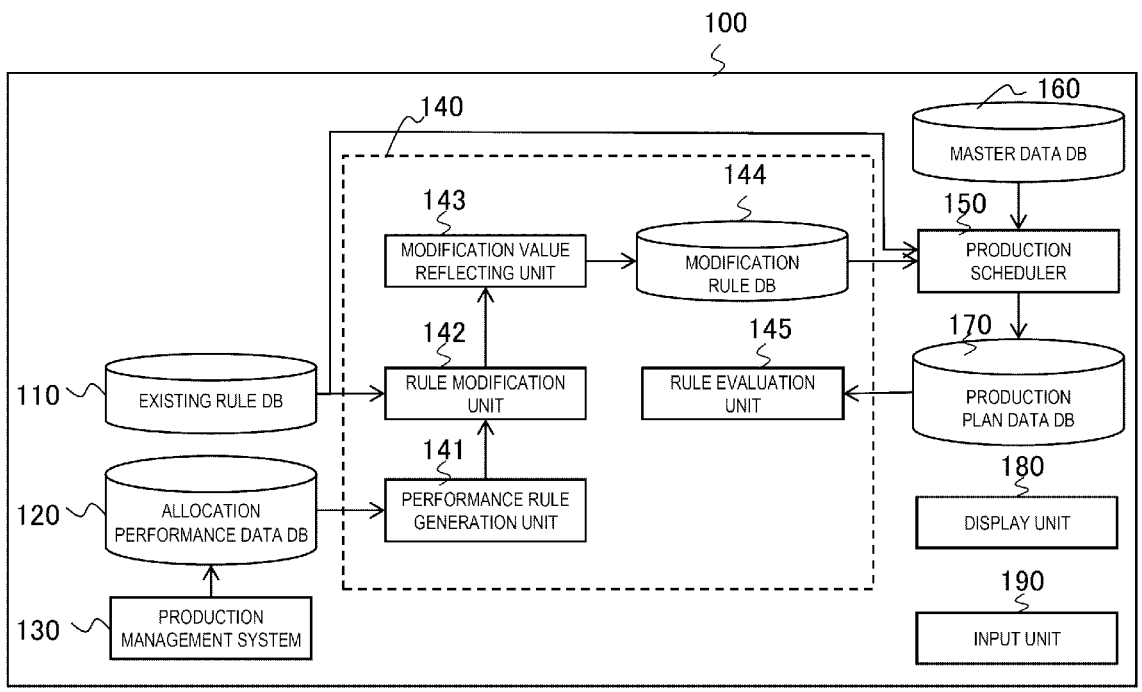

[FIG. 2]
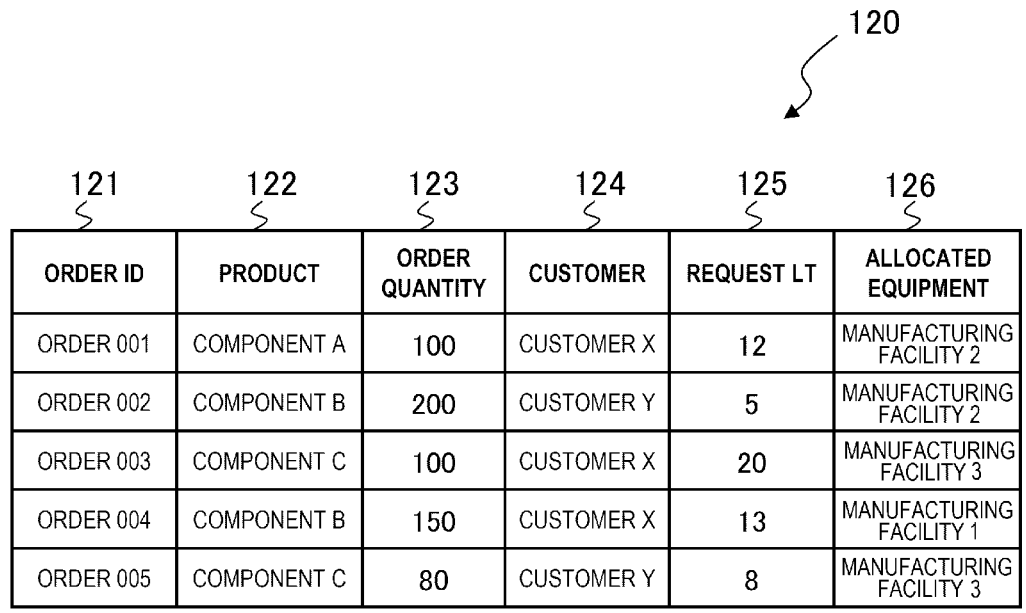
| ORDER ID | PRODUCT | ORDER QUANTITY | CUSTOMER | REQUEST LT | ALLOCATED EQUIPMENT |
|---|---|---|---|---|---|
| ORDER 001 | COMPONENT A | 100 | CUSTOMER X | 12 | MANUFACTURING FACILITY 2 |
| ORDER 002 | COMPONENT B | 200 | CUSTOMER Y | 5 | MANUFACTURING FACILITY 2 |
| ORDER 003 | COMPONENT C | 100 | CUSTOMER X | 20 | MANUFACTURING FACILITY 3 |
| ORDER 004 | COMPONENT B | 150 | CUSTOMER X | 13 | MANUFACTURING FACILITY 1 |
| ORDER 005 | COMPONENT C | 80 | CUSTOMER Y | 8 | MANUFACTURING FACILITY 3 |

[FIG. 3]

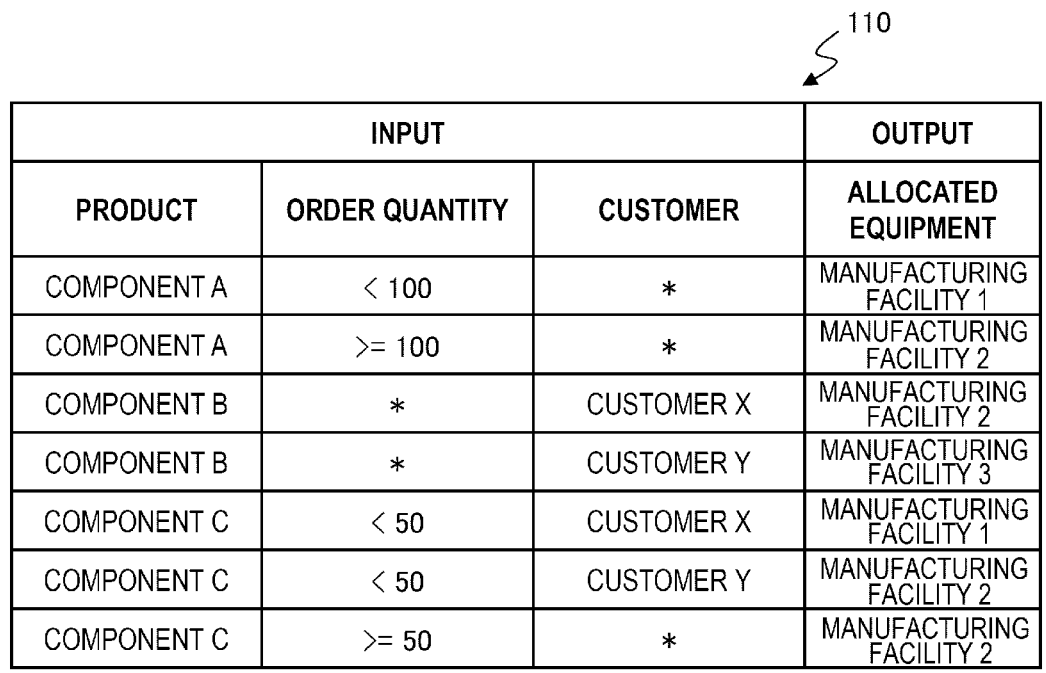

| INPUT | | | OUTPUT |
|---|---|---|---|
| PRODUCT | ORDER QUANTITY | CUSTOMER | ALLOCATED EQUIPMENT |
| COMPONENT A | < 100 | * | MANUFACTURING FACILITY 1 |
| COMPONENT A | >= 100 | * | MANUFACTURING FACILITY 2 |
| COMPONENT B | * | CUSTOMER X | MANUFACTURING FACILITY 2 |
| COMPONENT B | * | CUSTOMER Y | MANUFACTURING FACILITY 3 |
| COMPONENT C | < 50 | CUSTOMER X | MANUFACTURING FACILITY 1 |
| COMPONENT C | < 50 | CUSTOMER Y | MANUFACTURING FACILITY 2 |
| COMPONENT C | >= 50 | * | MANUFACTURING FACILITY 2 |

[FIG. 4]
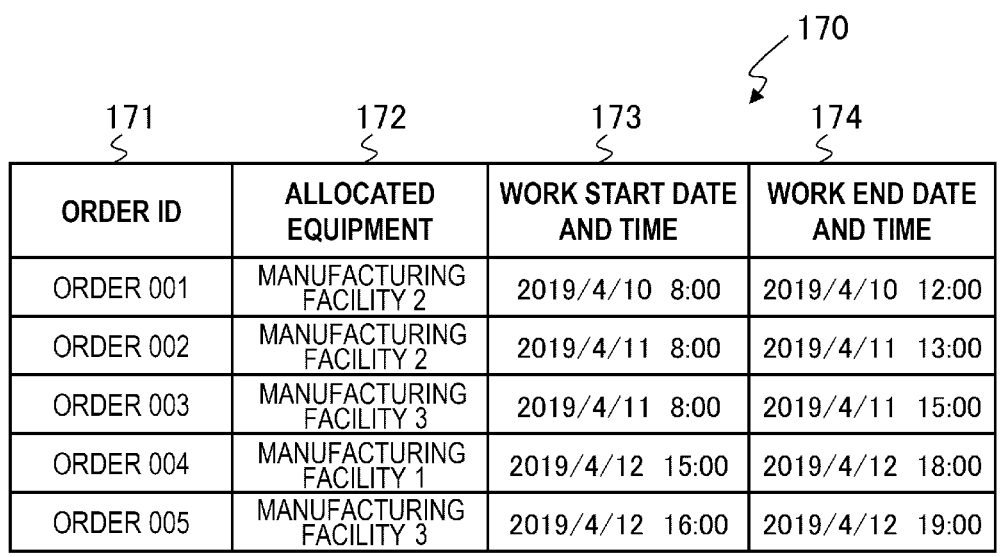

[FIG. 5]
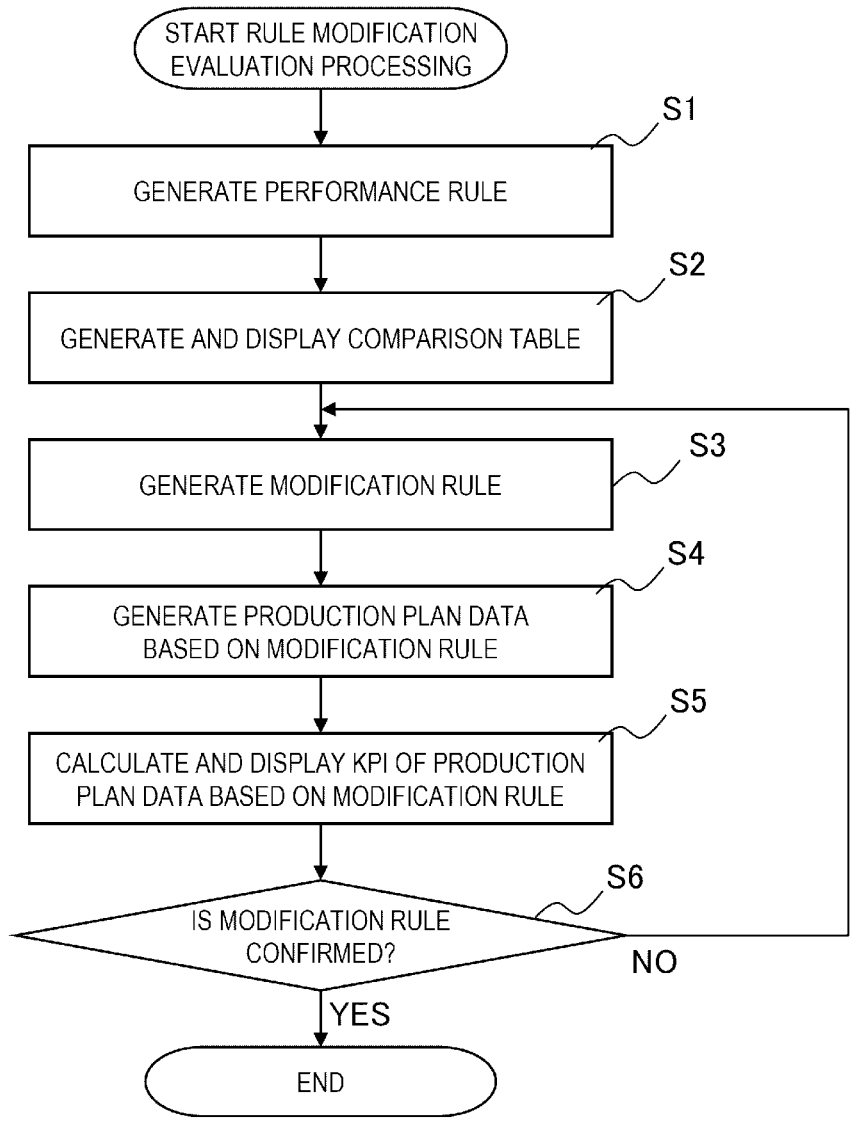

[FIG. 6]
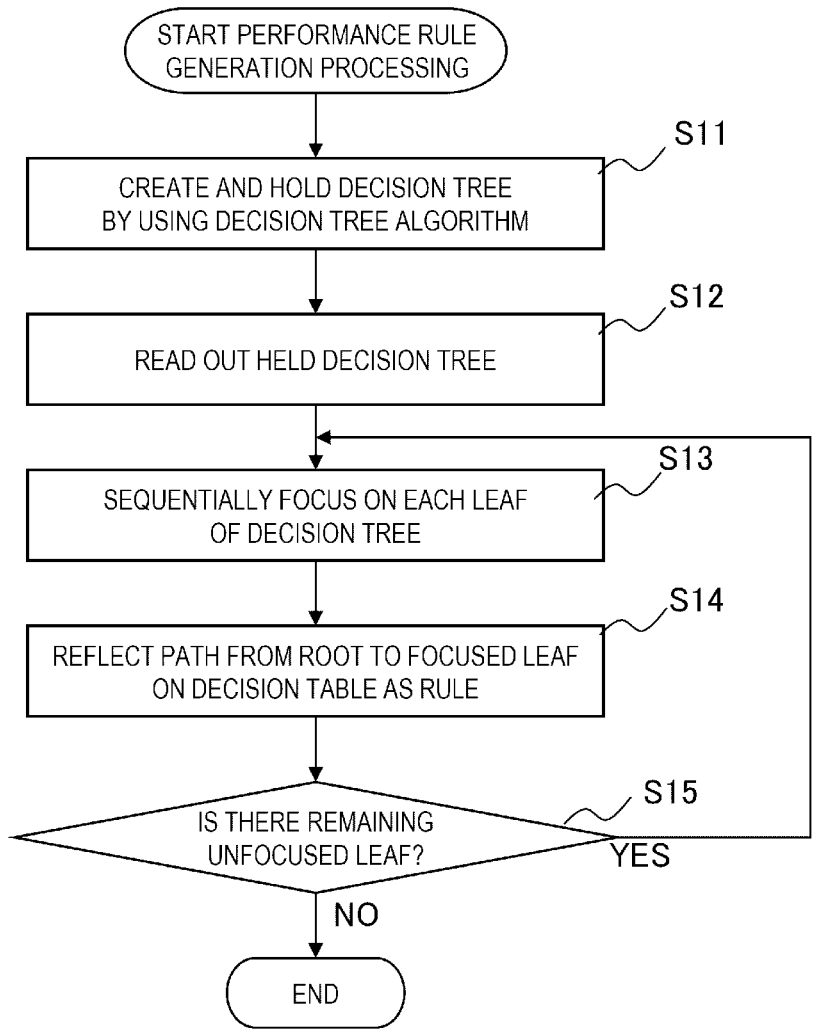

[FIG. 7]
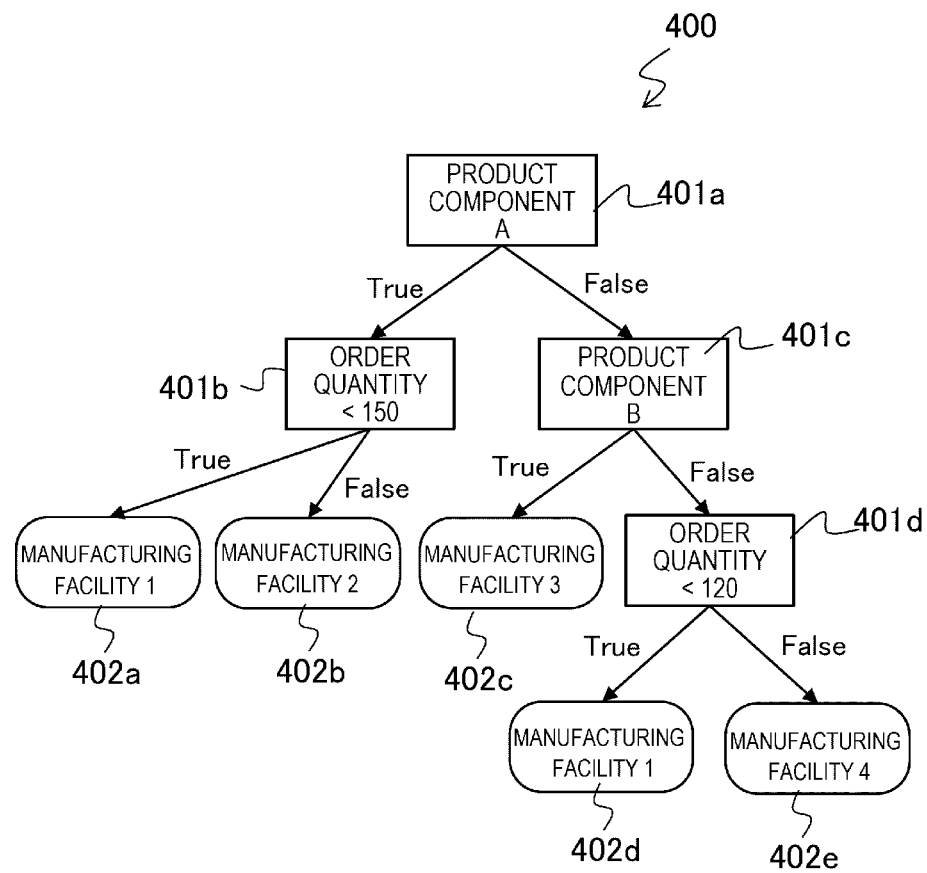

[FIG. 8]

| INPUT | | OUTPUT |
|---|---|---|
| PRODUCT | ORDER QUANTITY | ALLOCATED EQUIPMENT |
| COMPONENT A | < 150 | MANUFACTURING FACILITY 1 |

[FIG. 9]
| INPUT | | OUTPUT |
|---|---|---|
| PRODUCT | ORDER QUANTITY | ALLOCATED EQUIPMENT |
| COMPONENT A | < 150 | MANUFACTURING FACILITY 1 |
| COMPONENT A | >= 150 | MANUFACTURING FACILITY 2 |
| COMPONENT B | * | MANUFACTURING FACILITY 3 |
| * | < 120 | MANUFACTURING FACILITY 1 |
| * | >= 120 | MANUFACTURING FACILITY 4 |

[FIG. 10]

| | INPUT | | | | | | OUTPUT |
|---|---|---|---|---|---|---|---|
| | DETERMINATION VALUE MODIFICATION CANDIDATE | | DETERMINATION VALUE MODIFICATION CANDIDATE | | DELETION CANDIDATE | ADDITION CANDIDATE | |
| | ○ | ⊙ | ○ | ⊙ | ☐ | ☑ | |
| PERFORMANCE | PRODUCT | PRODUCT | ORDER QUANTITY | ORDER QUANTITY | CUSTOMER | REQUEST LT | ALLOCATED EQUIPMENT |
| ☑ | COMPONENT A | | < 100 | < 86 | * | <= 10 | MANUFACTURING FACILITY 1 |
| ☑ | COMPONENT A | | >= 100 | < 86 | * | > 10 | MANUFACTURING FACILITY 2 |
| ☐ | COMPONENT B | | * | | CUSTOMER X | * | MANUFACTURING FACILITY 2 |
| ☑ | COMPONENT C | | * | >= 86 | * | * | MANUFACTURING FACILITY 2 |

501, 502, 503, 504, 505

500, 511, 512, 513, 514

[FIG. 11]
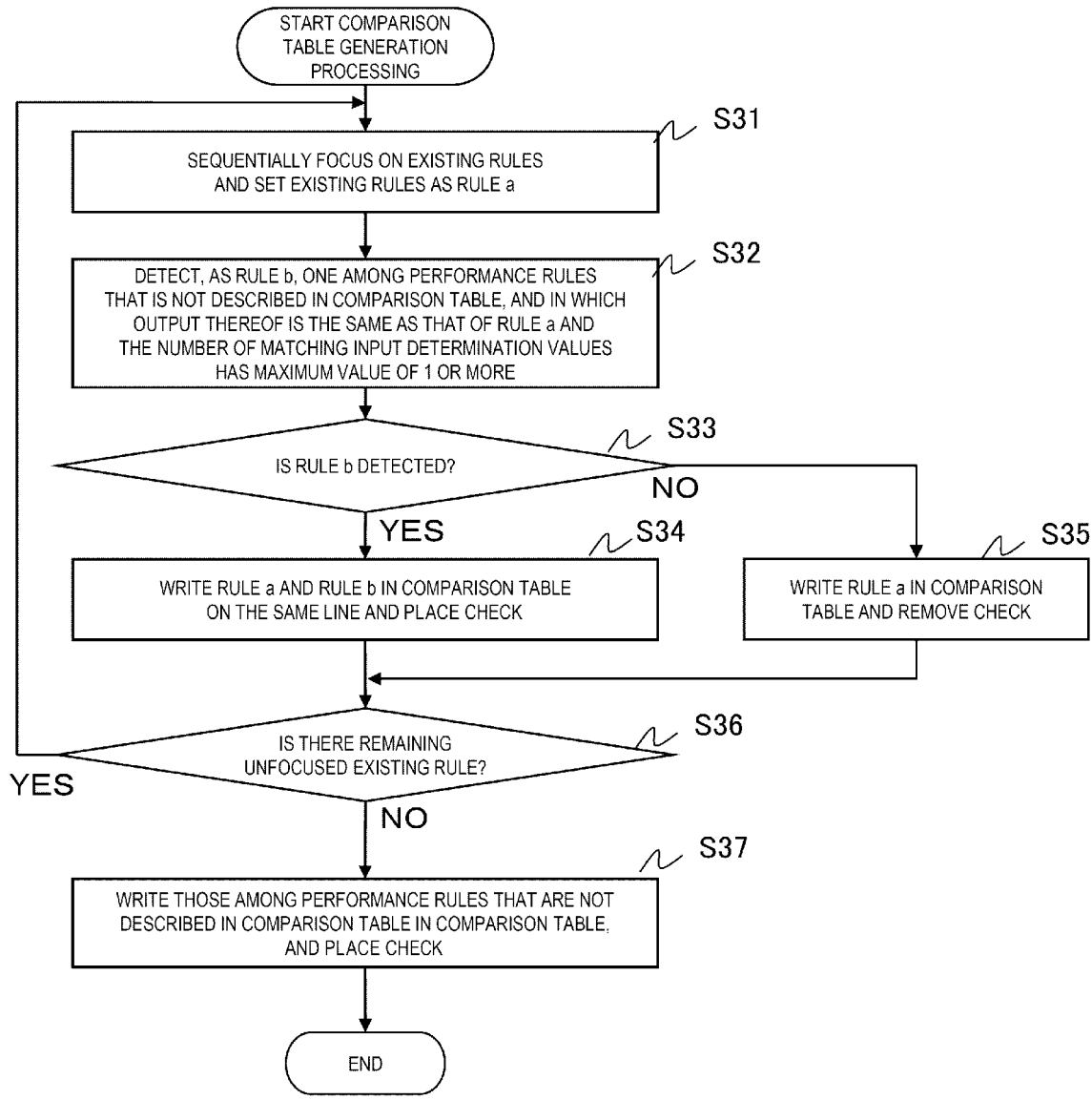

[FIG. 12]

RULE a

| INPUT | | | OUTPUT |
|---|---|---|---|
| PRODUCT | ORDER QUANTITY | CUSTOMER | ALLOCATED EQUIPMENT |
| COMPONENT A | > 100 | CUSTOMER X | MANUFACTURING FACILITY 2 |

PERFORMANCE RULE

| INPUT | | | | OUTPUT |
|---|---|---|---|---|
| PRODUCT | ORDER QUANTITY | CUSTOMER | REQUEST LT | ALLOCATED EQUIPMENT |
| COMPONENT A | > 100 | CUSTOMER Y | > 12 | MANUFACTURING FACILITY 2 |

[FIG. 13]
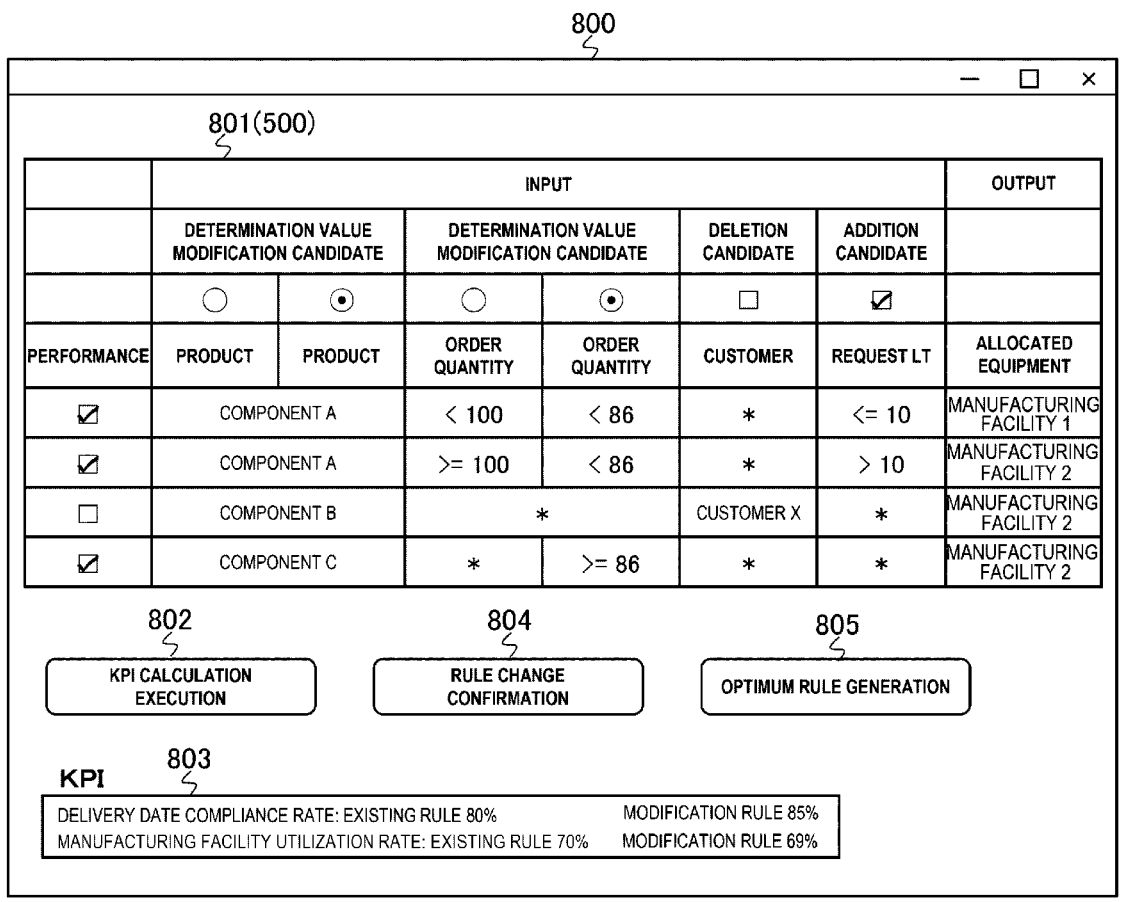

PRODUCTION PLANNING SYSTEM AND PRODUCTION PLANNING METHOD

CROSS-REFERENCE TO RELATED APPLICATION

The present application claims priority from Japanese application JP 2020-003575, filed on Jan. 14, 2020, the contents of which is hereby incorporated by reference into this application.

TECHNICAL FIELD

The present invention relates to a production planning system and a production planning method.

BACKGROUND ART

In a manufacturing industry that manufactures products using manufacturing facilities, a production plan is made by allocating manufacturing orders from customers to the manufacturing facilities to keep on time delivery. In the production planning work, it is necessary to define rules for allocating orders to the manufacturing facilities. Then, in a factories with various manufacturing facilities, there are enormous order allocation rules and when conditions of usable manufacturing facilities or the like change, it is necessary to extract a changed portion of the order allocation rules and modify the order allocation rules.

In a related art, it takes a lot of labor and time to modify the order allocation rules since a system engineer or the like repeatedly performs trial and error, so that a method of supporting the modification is proposed. For example, PTL 1 describes a technique that efficiently modifies the order allocation rules by a user by defining a modification range when the order allocation rules are modified.

CITATION LIST

Patent Literature

PTL 1: JP-A-2015-191418

SUMMARY OF INVENTION

Technical Problem

However, in the technique described in PTL 1, it is necessary to manually define the modification range of the order allocation rules, so that it still takes much time to modify the order allocation rules.

The invention is made in view of such a situation, and an object of the invention is to make it possible to shorten time required to modify the order allocation rules.

Solution to Problem

The present application includes a plurality of methods for solving at least a part of the above problems, and examples thereof are as follows.

In order to solve the above problems, an aspect of the invention is a production planning system that allocates a manufacturing facility for a manufacturing condition, and the production planning system includes: a performance rule generation unit that generates a performance rule in which the manufacturing condition is set as input and the manufacturing facility is set as output, based on allocation performance data representing a performance of allocating the manufacturing facility for the manufacturing condition; a rule modification unit that generates a comparison table representing a difference between the performance rule and an existing rule in which the manufacturing condition is set as input and the manufacturing facility is set as output; a modification value reflecting unit that generates a modification rule in which the existing rule is modified according to a user operation on the comparison table; and a rule evaluation unit that calculates an evaluation index for production plan data corresponding to each of the existing rule and the modification rule. The rule modification unit generates the comparison table including a modification plan for the existing rule.

Advantageous Effect

According to the invention, the time required to modify the order allocation rules can be shortened.

Problems, configurations, and effects other than those described above will be apparent from the following description of embodiments.

BRIEF DESCRIPTION OF DRAWINGS

FIG. 1 is a diagram showing a configuration example of a production planning system according to an embodiment of the invention.

FIG. 2 is a diagram showing an example of allocation performance data.

FIG. 3 is a diagram showing an example of an order allocation rule.

FIG. 4 is a diagram showing an example of production plan data.

FIG. 5 is a flowchart illustrating an example of rule modification evaluation processing.

FIG. 6 is a flowchart illustrating an example of performance rule generation processing.

FIG. 7 is a diagram showing an example of a decision tree generated by the performance rule generation processing.

FIG. 8 is a diagram showing an example of a rule corresponding to a path in the decision tree.

FIG. 9 is a diagram showing an example of a decision table generated based on the decision tree.

FIG. 10 is a diagram showing an example of a comparison table.

FIG. 11 is a flowchart illustrating an example of comparison table generation processing.

FIG. 12 is a diagram showing an example of rules for illustrating the number of matching determination values.

FIG. 13 is a diagram showing a display example of an operation screen.

DESCRIPTION OF EMBODIMENTS

Hereinafter, an embodiment of the invention will be described with reference to the drawings. In all the drawings for illustrating the embodiments, in principle, the same members are denoted by the same reference numerals, and repetitive descriptions thereof will be omitted. Further, in the following embodiments, it is needless to say that constituent elements (including element steps or the like) are not necessarily essential unless otherwise particularly specified or in principle considered to be obviously essential. In addition, it is needless to say that expressions "formed of A", "made of A", "having A", and "including A" do not exclude elements other than A unless otherwise stated that A is the only element thereof. Similarly, in the following embodiments, shapes, position relationships, or the like of the constituent elements or the like include those substantially approximate or similar to the shapes or the like unless otherwise particularly specified or in principle considered to be obviously excluded.

Configuration Example of Production Planning System 100 according to Embodiment of Invention FIG. 1 shows a configuration example of a production planning system 100 according to an embodiment of the invention. The production planning system 100 is for presenting a modification plan of existing order allocation rules to a user and assisting the user in a modification of the order allocation rules, based on the existing order allocation rules and allocation performance data representing a performance of allocating manufacturing orders from customers to manufacturing facilities.

The production planning system 100 includes, for example, a general computer such as a personal computer including a central processing unit (CPU), a memory, a storage, an input device, an output device, and a communication module, or the like, and implements functional blocks to be described below by the CPU executing a predetermined program.

The production planning system 100 includes respective functional blocks of an existing rule data base (DB) 110, an allocation performance data DB 120, a production management system 130, a rule modification evaluation unit 140, a production scheduler 150, a master data DB 160, a production plan data DB 170, a display unit 180, and an input unit 190. The production management system 130 and the production scheduler 150 may be implemented individually or integrally by a computer different from the computer that implements the production planning system 100.

The existing rule DB 110 holds the existing order allocation rules (hereinafter, also referred to as existing rules) that are manually input. The existing rule DB 110 outputs the held existing rules in response to requests from the rule modification evaluation unit 140 and the production scheduler 150.

The allocation performance data DB 120 holds the allocation performance data received from the production management system 130. The allocation performance data DB 120 outputs the held allocation performance data in response to the request from the rule modification evaluation unit 140.

The production management system 130 acquires production performances of such as a manufacturing execution system (MES). In addition, the production management system 130 controls and monitors a production line, determines in which manufacturing facility products corresponding to manufacturing conditions (a product, an order quantity, a request LT, or the like) represented by each order from the customers are manufactured based on information obtained from the production line, generates the allocation performance data based on a determination result thereof, and output the allocation performance data to the allocation performance data DB 120.

The rule modification evaluation unit 140 presents the user with the modification plan of the existing rules, and generates modification data in which the modification by the user is reflected. In addition, the rule modification evaluation unit 140 outputs an modification rule to the production scheduler 150 to generate production plan data. The rule modification evaluation unit 140 includes a performance rule generation unit 141, a rule modification unit 142, a modification value reflecting unit 143, a modification rule DB 144, and a rule evaluation unit 145.

The performance rule generation unit 141 generates performance-based order allocation rules (hereinafter, referred to as performance rules) based on the allocation performance data received from the allocation performance data DB 120, and outputs the performance rules to the rule modification unit 142. Specifically, the performance rule generation unit 141 generates performance rules in a decision tree format based on the allocation performance data, then converts the performance rules in a decision table format and outputs the performance rules in the decision table format to the rule modification unit 142.

The rule modification unit 142 generates a comparison table 500 (FIG. 10) representing a difference between the existing rules received from the existing rule DB 110 and the performance rules received from the performance rule generation unit 141. The rule modification unit 142 causes the display unit 180 to display an operation screen 800 (FIG. 13) including the generated comparison table 500.

The modification value reflecting unit 143 generates the modification rule by reflecting an input from the user on the operation screen 800 on the existing rules and outputs the modification rule to the modification rule DB 144. The modification rule DB 144 holds the modification rule and outputs the held modification rule to the production scheduler 150.

The rule evaluation unit 145 calculates a main performance evaluation index (hereinafter, referred to as a key performance indicator (a KPI)) for the production plan data received from the production plan data DB 170. As the KPI, for example, a delivery date compliance rate and a manufacturing facility operation rate are calculated.

The delivery date compliance rate is an index representing a degree of compliance with a delivery date contracted with the customers, and is calculated using the following equation (1).

Delivery date compliance rate=the number of orders whose work is completed before delivery/total number of orders    (1)

The manufacturing facility operation rate is an index representing a utilization rate of an operation planning time, which is planned at a time of the production planning, and is calculated using the following equation (2).

Manufacturing facility operation rate=actual operating time/total planned operating time    (2)

The KPI calculated by the rule evaluation unit 145 is not limited to the delivery date compliance rate and the manufacturing facility operation rate, and another KPI may be calculated.

The production scheduler 150 requests the existing rules from the existing rule DB 110 and master data from the master data DB 160, generates the production plan data corresponding to the existing rules based on the existing rules and the master data both being input in response to this request, and outputs the production plan data to the production plan data DB 170.

In addition, the production scheduler 150 generates the production plan data corresponding to the modification rule based on the modification rule received from the modification rule DB 144 and the master data and outputs the production plan data to the production plan data DB 170.

The generated production plan data includes allocated manufacturing facilities for each order, work start date and time, work end date and time, or the like.

The master data DB 160 holds the master data representing specifications of the products or manufacturing facilities, and outputs the held master data in response to the request from the production scheduler 150. The production plan data DB 170 holds the production plan data generated by the production scheduler 150, and outputs the held production plan data in response to a request from the rule evaluation unit 145.

The display unit 180 includes an output device such as a liquid crystal display provided in a computer, and displays the operation screen 800 (FIG. 13) to be described later. The input unit 190 includes an input device such as a keyboard, a mouse, and a touch panel provided in a computer, and receives various operations, a numerical input, or the like from the user.

Next, FIG. 2 shows an example of a data structure of the allocation performance data DB 120. The allocation performance data DB 120 includes an order ID field 121, a product field 122, an order quantity field 123, a customer field 124, a request lead time (LT) field 125, and an allocated manufacturing facility field 126.

In the order ID field 121, order IDs (identifiers) for identifying the orders that are targets of the production performances are recorded. In the product field 122, names of the products manufactured in the orders that are the targets of the production performances are recorded. In the order quantity field 123, the numbers of the products manufactured in the orders that are the targets of the production performances are recorded. In the customer field 124, names of ordering customers of the orders that are the targets of the production performances are recorded. In the request LT field 125, delivery lead times (delivery dates) of the orders that are the targets of the production performances are recorded. In the allocated manufacturing facility field 126, names of the manufacturing facility for producing the products of the orders that are the targets of the production performances are recorded.

In a case of FIG. 2, for example, in order ID: order 001, product name: component A, order quantity: 100, customer: customer X, request LT: 12, allocated manufacturing facility: manufacturing facility 2 are recorded in association with the order ID: order 001. In addition, for example, in order ID: order 002, product name: component B, order quantity: 200, customer: customer Y, request LT: 5, allocated manufacturing facility: manufacturing facility 2 are recorded in association with the order ID: order 002.

Next, FIG. 3 shows an example of the order allocation rules (the existing rules) in the decision table format. In the existing rules, an output (allocated manufacturing facility) is recorded in association with the input (the product, the order quantity, and the customer) representing each order. In the case of FIG. 3, since each line represents one rule, seven lines, that is, seven rules are recorded. "*" in a decision table means an optional value. The same applies to subsequent drawings.

For example, a rule in a first line means that when the order is product: component A and order quantity: less than 100, a manufacturing facility 1 is allocated. In addition, for example, a rule in a second line means that when the order is product: component A and order quantity: 100 or more, a manufacturing facility 2 is allocated. Further, for example, a rule in a third line means that when the order is product: component B and customer: customer X, the manufacturing facility 2 is allocated regardless of the order quantity.

The performance rules generated by the performance rule generation unit 141 are also represented in the decision table format similarly to the existing rules (to be described later with reference to FIG. 9).

Next, FIG. 4 shows an example of a data structure of the production plan data DB 170. The production plan data DB 170 includes an order ID field 171, an allocated manufacturing facility field 172, a work start date and time field 173, and a work end date and time field 174.

In the order ID field 171, order IDs (identifiers) for identifying orders that are targets of the production plan are recorded. In the allocated manufacturing facility field 172, names of the manufacturing facilities for producing the products of the orders that are the targets of the production plan are recorded. In the work start date and time field 173, date and time when production of the orders that are the targets of the production plan is started is recorded. In the work end date and time field 174, the date and time when the production of the orders that are the targets of the production plan is finished is recorded.

In the case of FIG. 4, for example, in order ID: order 001, allocated manufacturing facility: the manufacturing facility 2, work start date and time: 2019/4/10 8:00, and work end date and time: 2019/4/10 12:00 are recorded in association with the order ID: order 001. In addition, for example, in order ID: order 002, allocated manufacturing facility: the manufacturing facility 2, work start date and time: 2019/4/11 8:00, and work end date and time: 2019/4/11 13:00 are recorded in association with the order ID: order 002.

<Rule Modification Evaluation Processing Performed by Production Planning System 100>

Next, FIG. 5 is a flowchart illustrating an example of rule modification evaluation processing performed by the production planning system 100.

The rule modification evaluation processing is started in response to a predetermined start operation from the user. First, the performance rule generation unit 141 requests the allocation performance data from the allocation performance data DB 120, generates the performance rules by performance rule generation processing based on the allocation performance data received in response to this request and outputs the performance rules to the rule modification unit 142 (step S1). Details of the performance rule generation processing in step S1 will be described later with reference to FIGS. 6 to 9.

Next, the rule modification unit 142 requests the existing rules from the existing rule DB 110, generates the comparison table 500 (FIG. 10) representing the difference between the existing rules received according to this request and the performance rules received from the performance rule generation unit 141 and outputs the comparison table 500 to the modification value reflecting unit 143 (step S2). The generated comparison table 500 is displayed on the display unit 180 as a part of the operation screen 800 (FIG. 13). Details of the comparison table 500 will be described later with reference to FIG. 10.

Next, the modification value reflecting unit 143 reflects the input (a selection by a radio button 511, a presence or absence of a check to check boxes 512, 513) of the user to the comparison table 500 on the operation screen 800 on the existing rules to generate an unconfirmed modification rule and outputs the modification rule to the modification rule DB 144 (step S3).

Next, the production scheduler 150 requests the unconfirmed modification rule from the modification rule DB 144 and the master data from the master data DB 160, generates the production plan data based on the unconfirmed modification rule and the master data both being input in response to these requests and outputs the production plan data to the production plan data DB 170 (step S4).

Next, the rule evaluation unit 145 requests the production plan data corresponding to the unconfirmed modification rule from the production plan data DB 170, and calculates the KPI for the production plan data that is input in response to this request (step S5). The calculated KPI is displayed on the operation screen 800 together with the KPI of the production plan data corresponding to the existing rules. It is assumed that the KPI of the production plan data corresponding to the existing rules is calculated in advance.

Next, the rule modification unit 142 determines whether or not the modification rule is confirmed by the user based on an operation (a click operation on a rule change confirmation button 804 (FIG. 13)) on the operation screen 800 from the user (step S6). Here, when the modification rule is not confirmed and the user modifies the existing rules (changes the input to the radio button 511 and the check boxes 512 and 513) (NO in step S6), the processing is returned to step S3, and subsequent steps are repeated. On the contrary, when the modification rule is confirmed (YES in step S6), the rule modification evaluation processing ends.

According to the above rule modification evaluation processing, the user can confirm the modification plan of the existing rules by the comparison table 500 on the operation screen 800, and can instruct the modification of the existing rules on the operation screen 800. Further, the modification rule can be confirmed after confirming the KPI for the production plan data corresponding to the modification rule on the operation screen 800.

Next, the performance rule generation processing performed by the performance rule generation unit 141 in step S1 of the rule modification evaluation processing will be described in detail. FIG. 6 is a flowchart illustrating an example of the performance rule generation processing.

First, the performance rule generation unit 141 creates and holds a decision tree using an ID3 system decision tree algorithm based on the allocation performance data received from the allocation performance data DB 120 (step S11). Here, the decision tree to be created is one in which the order including a product to be manufactured, a quantity, and a customer name is input, and the manufacturing facility allocated to the order is output.

FIG. 7 shows an example of a decision tree 400 created based on the allocation performance data. The decision tree 400 includes nodes (non-terminal nodes) 401a to 401d for performing a local classification determination using a test function, and leaves 402a to 402e provided with "manufacturing facility 1", "manufacturing facility 2", "manufacturing facility 3", or "manufacturing facility 4" as a label (a decision result). Hereinafter, the nodes 401a to 401d will be referred to as a node 401 unless it is necessary to be distinguished from one another. The same applies to leaves 402a to 402e.

In the decision tree 400, from the highest node 401a (also called a root 401a) to the lower node 401, a classification processing is sequentially advanced based on the classification determination by the test function, and a label given to a leaf 402 that finally arrived is output.

For example, when order information (product: component A, order quantity: 200) is input to the decision tree 400, the classification determination based on the test function (whether the product is the component A) is performed in the root 401a. Since a condition of the test function is satisfied here, the processing proceeds to the node 401b. Next, in the node 401b, the classification determination based on the test function (the order quantity is less than 150) is performed. Since the condition of the test function is not satisfied here, the processing proceeds to the leaf 402b. Finally, on the leaf 402b, the label "manufacturing facility 2" is output as the decision result.

Return to FIG. 6. In steps S12 to S15 of FIG. 6, based on the decision tree 400 shown in FIG. 7, each path (route) from the root 401a to each of the leaves 402a to 402e is set as one rule, and the rule is added to the decision table.

Specifically, the performance rule generation unit 141 reads out the decision tree 400 created and held in step S11 (step S12), and sequentially focuses on unfocused leaves among the leaves 402a to 402e of the decision tree 400 (Step S13). Next, the performance rule generation unit 141 sets the label of the focused leaf 402 as an output item, generates a rule using the test functions of all the nodes 401 existing in the path from the root 401a to the focused leaf 402 as an input item and adds the rule to the decision table (step S14).

FIG. 8 shows a rule corresponding to the path from the root 401a to the leaf 402a of the decision tree 400. The input item (product: component A) in the rule corresponds to the test function of the root 401a, the input item (order quantity: less than 150) corresponds to the test function of the node 401b, and the output item (allocated manufacturing facility: manufacturing facility 1) corresponds to the label of the leaf 402a.

Return to FIG. 6. Next, the performance rule generation unit 141 determines whether or not there is a remaining unfocused leaf 402 (step S15), and when it is determined that there is a remaining unfocused leaf 402 (YES in step S15), the processing is returned to step S13 and steps S13 to S15 are repeated. Thereafter, when it is determined that there is no remaining unfocused leaf 402 (NO instep S15), the performance rule generation processing ends.

Next, FIG. 9 shows an example of a decision table 410 converted from the decision tree 400 shown in FIG. 7.

In a first line of the decision table 410, as described above, the rule corresponding to the path from the root 401a to the leaf 402a of the decision tree 400 is recorded. In a second line, a rule corresponding to the path from the root 401a to the leaf 402b of the decision tree 400 is recorded. The input (product: component A) in the rule corresponds to the test function of the root 401a, the input (order quantity: 150 or more) corresponds to the test function of the node 401b, and the output (allocated manufacturing facility: manufacturing facility 2) corresponds to the label of the leaf 402b.

In a third line, a rule corresponding to the path from the root 401a to the leaf 402c of the decision tree 400 is recorded. The input (product: component B) in the rule corresponds to the test function of the node 401c, and the output (allocated manufacturing facility: manufacturing facility 3) corresponds to the label of the leaf 402c. In a fourth line, a rule corresponding to the path from the root 401a to the leaf 402d of the decision tree 400 is recorded. The input (order quantity: less than 120) in the rule corresponds to the test function of the node 401d, and the output (allocated manufacturing facility: manufacturing facility 1) corresponds to the label of the leaf 402d. In a fifth line, a rule corresponding to the path from the root 401a to the leaf 402e of the decision tree 400 is recorded. The input (order quantity: 120 or more) in the rule corresponds to the test function of the node 401d, and the output (allocated manufacturing facility: manufacturing facility 4) corresponds to the label of the leaf 402e.

Next, FIG. 10 shows an example of the comparison table 500 generated by the rule modification unit 142.

The comparison table 500 is for showing the difference between the performance rules and the existing rules, facilitating the comparison between the performance rules and the existing rules, and assisting the modification of the existing rules by the user.

In the comparison table 500, each line basically represents one rule, similarly to the decision table 410 (FIG. 9) representing the performance rules. However, in the comparison table 500, the one line may represent two rules in order to facilitate the comparison between the existing rules and the performance rules. Each rule is associated with the input item (product, order quantity, customer, and request LT) and the output item (allocated manufacturing facility).

In the comparison table 500, the performance rules and the existing rules are compared from three types of viewpoints of "determination value", "item addition", and "item deletion", and a modification plan for the existing rules is presented.

As a modification plan for the "determination value", when the determination values of the same input item are different between the performance rule and the existing rule, the determination value of the performance rule is presented as the modification plan.

A modification plan for the "item addition" presents an addition of the input item existing in the performance rules as the modification plan for the input item existing in the performance rules but not existing in the existing rules.

A modification plan for the "item deletion" presents a deletion of the input item existing in the existing rules as the modification plan for the input item existing in the existing rules but not existing in the performance rules.

When the comparison table 500 is created, each input item existing in the performance rules and the existing rules is classified into the above three types of viewpoints, and a modification content label is set.

Specifically, when the same input item exists in the performance rule and the existing rule and the determination values are different, a "determination value modification" label is set for the input item.

In addition, a "new addition" label is set for an input item existing in the performance rule but not existing in the existing rule.

Further, a "deletion" label is set for an input item existing in the existing rule but not existing in the performance rule.

In order to display the determination value before the modification and the determination value after the modification in the item for which the "determination value modification" label is set, specifically, in a product item column 502 and an order quantity item column 503, the item is divided into two columns and displayed, and the radio button 511 for allowing the user to select either the determination value before the modification or the determination value after the modification is displayed.

In the item for which the "new addition" label is set, specifically, in a case of FIG. 10, in a request LT item column 505, an "addition candidate" is displayed in a header portion, and the check box 512 for allowing the user to select whether or not to add the item is displayed.

In the item for which the "deletion" label is set, specifically, in the case of FIG. 10, in a customer item column 504, a "deletion candidate" is displayed in the header portion, and the check box 513 for allowing the user to select whether or not to delete the item is displayed.

A check box 514 representing whether each rule of the comparison table 500 exists in the performance rules or exists in the existing rules is provided in a leftmost performance column 501. When the check box 514 is checked, it means that the rule of the line exists in the performance rules, and when the check is removed, it means that the rule of the line does not exist in the performance rules, that is, the rule exists in the existing rules.

Next, FIG. 11 is a flowchart illustrating an example of comparison table generation processing.

First, the rule modification unit 142 sequentially focuses on the existing rules and sets the existing rule as a rule a (step S31). Next, the rule modification unit 142 detects, as a rule b, one among the performance rules that is not described in the comparison table 500, and in which a value of the output item is the same as that of the rule a, and the number of matching determination values between the rule a and the input item has a maximum value of 1 or more (step S32). In step S32, the rule b may not be detected when there is no performance rule that satisfies the above conditions.

Here, the number of matching determination values will be described. FIG. 12 shows an example of the rule a and the performance rule. The rule a and the performance rule have the same allocated manufacturing facility (manufacturing facility 2) in the output item. On the other hand, regarding the input item, since the product (component A) is the same and the order quantity (100 or more) is the same, the number of matching determination values is 2. Although different in the example of FIG. 12, the number of matching determination values is set to 3 if the customer of the input item is also the same.

With reference to FIG. 11 again, next, the rule modification unit 142 determines whether or not the rule b is detected in step S32 (step S33). Here, when it is determined that the rule b is detected (YES in step S33), the rule modification unit 142 writes the rule a and the rule b in the same line of the comparison table 500 and checks the check box 514 in the column 501 (step S34).

On the contrary, when it is determined that the rule b is not detected (NO in step S33), the rule modification unit 142 writes the rule a in the comparison table 500 and remove the check of the check box 514 in the column 501 (step S35).

Next, the rule modification unit 142 determines whether or not there is a remaining unfocused existing rule (step S36). Here, when it is determined that there is a remaining unfocused existing rule (YES in step S36), the rule modification unit 142 returns the processing to step S31 and repeats steps S31 to S36. Thereafter, when it is determined that there is no remaining unfocused existing rule (NO in step S36), next, the rule modification unit 142 writes those among the performance rules that are not described in the comparison table 500 in the comparison table 500, and checks the check box 514 in the column 501 (Step S37). Thus, the comparison table generation processing ends.

According to the comparison table generation processing, the user can easily compare the existing rules with the performance rules, and further, the comparison table 500 capable of presenting a plurality of modification plans for the existing rules by changing the determination values in the input item or deleting or adding the input item can be generated.

<Display Example of Operation Screen 800>

Next, FIG. 13 shows a display example of the operation screen 800 displayed on the display unit 180.

The operation screen 800 is provided with a comparison table display area 801, a KPI calculation execution button 802, a KPI display area 803, the rule change confirmation button 804, and an optimum rule generation button 805.

The above comparison table 500 is displayed in the comparison table display area 801.

The KPI calculation execution button 802 is an operation button for the user to instruct a calculation of the KPI. When the user clicks the KPI calculation execution button 802, the production scheduler 150 generates the production plan data based on the existing rules and the production plan data based on the unconfirmed modification rule selected in the comparison table 500, and the rule evaluation unit 145 calculates the KPI for each production plan data.

The calculated KPI is displayed in the KPI display area 803. In the case of FIG. 13, the delivery date compliance rate of the production plan data based on the existing rules is 80%, a manufacturing facility utilization rate is 70%, the delivery date compliance rate of the production plan data based on the unconfirmed modification rule is 85%, and the manufacturing facility utilization rate is 69%. Therefore, it is shown that the manufacturing facility utilization rate is almost unchanged, but the delivery date compliance rate is higher in the unconfirmed modification rule than in the existing rules.

The rule change confirmation button 804 is an operation button for confirming the unconfirmed modification rule selected by the user in the comparison table 500. When the user confirms the KPI displayed in the KPI display area 803 and clicks the rule change confirmation button 804, the unconfirmed modification rule selected in the comparison table 500 is confirmed, and thereafter, the confirmed modification rule is used in the production scheduler 150 as the existing rule.

In a case of the present embodiment, all unconfirmed modification rules selected in the comparison table 500 are adopted as the existing rules thereafter, but the embodiment may be configured such that in the comparison table 500, the user can select the unconfirmed modification rule, and only the unconfirmed modification rule selected by the user is adopted as the existing rule thereafter.

The optimum rule generation button 805 is an operation button for instructing generation of an optimum modification rule without the user modifying the existing rules or confirming the KPI. When the user clicks the optimum rule generation button 805, a plurality of unconfirmed modification rules corresponding to all combinations of the selection by the radio button 511 in the comparison table 500 and the presence or absence of the check to the check boxes 512, 513 are generated, the production plan data based on respective modification rules are generated and the KPIs thereof are calculated. Then, a modification rule with a highest KPI is reflected in the comparison table 500, and the KPI is displayed in the KPI display area 803.

According to the operation screen 800 described above, the user can easily compare the existing rules with the performance rules by the comparison table 500, and further, the comparison table 500 in which the determination values in the input item can be changed or the input item can be deleted or added can be generated. In addition, according to the operation screen 800, the KPI of the production plan data based on the existing rule and the KPI of the production plan data based on the unconfirmed modification rule can be confirmed. Further, the optimum modification rule can also be created.

The invention is not limited to the embodiments described above, and various modifications can be made. For example, the embodiments described above have been described in detail for easy understanding of the invention, and are not necessarily limited to those including all the configurations described above. Further, a part of the configuration of an embodiment may be replaced with or added to the configuration of another embodiment.

Further, a part or all of the above configurations, functions, processing units, processing methods, or the like may be implemented by hardware, for example, by designing an integrated circuit. Further, the above configurations, functions, or the like may be implemented by software by means of a processor interpreting and executing a program for implementing respective functions. Information such as a program, a table, a file, or the like for implementing the respective functions can be stored in a recording apparatus such as a memory, a hard disk, or a solid state drive (SSD), or in a recording medium such as an IC card, an SD card, or a DVD. Control lines or information lines indicate what is considered necessary for explanation, and not all the control lines or information lines are shown in a product. It may be considered that almost all the configurations are actually connected to each other.

REFERENCE SIGN LIST 100 production planning system,
121 order ID field
122 product field
123 order quantity field
124 customer field
125 request LT field
126 allocated manufacturing facility field
130 production management system
140 rule modification evaluation unit
141 performance rule generation unit
142 rule modification unit
143 modification value reflecting unit
145 rule evaluation unit
150 production scheduler
171 order ID field
172 allocated manufacturing facility field
173 work start date and time field
174 work end date and time field
180 display unit
190 input unit
400 decision tree
401 node
402 leaf
410 decision table
500 comparison table
511 radio button
512 to 514 check boxes
800 operation screen
801 comparison table display area
802 KPI calculation execution button
803 KPI display area
804 rule change confirmation button
805 optimum rule generation button

The invention claimed is:

1. A production planning system that allocates a manufacturing facility for a manufacturing condition, comprising:
a performance rule generation unit that generates a performance rule, in which the manufacturing condition is set as input and the manufacturing facility is set as output, based on allocation performance data representing a performance of allocating the manufacturing facility for the manufacturing condition;
a rule modification unit that generates a comparison table representing a difference between the performance rule and an existing rule in which the manufacturing condition is set as input and the manufacturing facility is set as output;

a modification value reflecting unit that generates a modification rule in which the existing rule is modified according to a user operation on the comparison table; and a rule evaluation unit that calculates an evaluation index for production plan data corresponding to each of the existing rule and the modification rule, wherein the rule modification unit generates the comparison table including a modification plan for the existing rule, wherein the rule modification unit displays the comparison table and the evaluation index for the production plan data corresponding to each of the existing rule and the modification rule on an operation screen, wherein according to a predetermined user operation on the operation screen, the modification value reflecting unit generates a plurality of modification rules each being obtained by modifying the existing rule, the rule evaluation unit calculates an evaluation index for the production plan data corresponding to each of the plurality of modification rules, the rule modification unit displays the modification rule having a highest calculated evaluation index among the plurality of modification rules on the operation screen.

2. The production planning system according to claim 1, wherein when the same item of the manufacturing condition is different in determination value between the existing rule and the performance rule, the rule modification unit generates the comparison table in which one of a determination value of the existing rule and a determination value of the performance rule is selectable by a user.

3. The production planning system according to claim 1, wherein when an item of the manufacturing condition existing in the existing rule does not exist in the manufacturing condition of the performance rule, the rule modification unit generates the comparison table in which deletion of the item of the manufacturing condition that exists in the existing rule but does not exist in the performance rule in the modification rule is selectable by a user.

4. The production planning system according to claim 1, wherein when an item of the manufacturing condition not existing in the existing rule exists in the manufacturing condition of the performance rule, the rule modification unit generates the comparison table in which addition of the item of the manufacturing condition that exists in the performance rule but does not exist in the existing rule in the modification rule is selectable by a user.

5. The production planning system according to claim 1, wherein the rule evaluation unit calculates, as the evaluation index, at least one of a delivery date compliance rate and a manufacturing facility operation rate.

6. The production planning system according to claim 1, wherein the performance rule generation unit generates, based on the allocation performance data, the performance rule in which the manufacturing condition including at least one item of a product, an order quantity, a customer, and a request LT is set as input and the manufacturing facility is set as output.

7. A production planning method to be performed in a production planning system that allocates a manufacturing facility for a manufacturing condition, the production planning method comprising:

a performance rule generating step of generating a performance rule in which the manufacturing condition is set as input and the manufacturing facility is set as output, based on allocation performance data representing a performance of allocating the manufacturing facility for the manufacturing condition;

a comparison table generating step of generating a comparison table representing a difference between the performance rule and an existing rule in which the manufacturing condition is set as input and the manufacturing facility is set as output;

a modification rule generating step of generating a modification rule in which the existing rule is modified according to a user operation on the comparison table; and a rule evaluation step of calculating a main performance evaluation index for production plan data corresponding to each of the existing rule and the modification rule, wherein in the comparison table generating step, the comparison table including a modification plan for the existing rule is generated, wherein the comparison table generating step displays the comparison table and the evaluation index for the production plan data corresponding to each of the existing rule and the modification rule on an operation screen, wherein according to a predetermined user operation on the operation screen, the modification rule generating step generates a plurality of modification rules each being obtained by modifying the existing rule, the rule evaluation step calculates an evaluation index for the production plan data corresponding to each of the plurality of modification rules, the comparison table generating step displays the modification rule having a highest calculated evaluation index among the plurality of modification rules on the operation screen.

* * * * *